F. L. HOAGLIN.
FUNNEL.
APPLICATION FILED JAN. 26, 1911.
1,033,173.
Patented July 23, 1912.
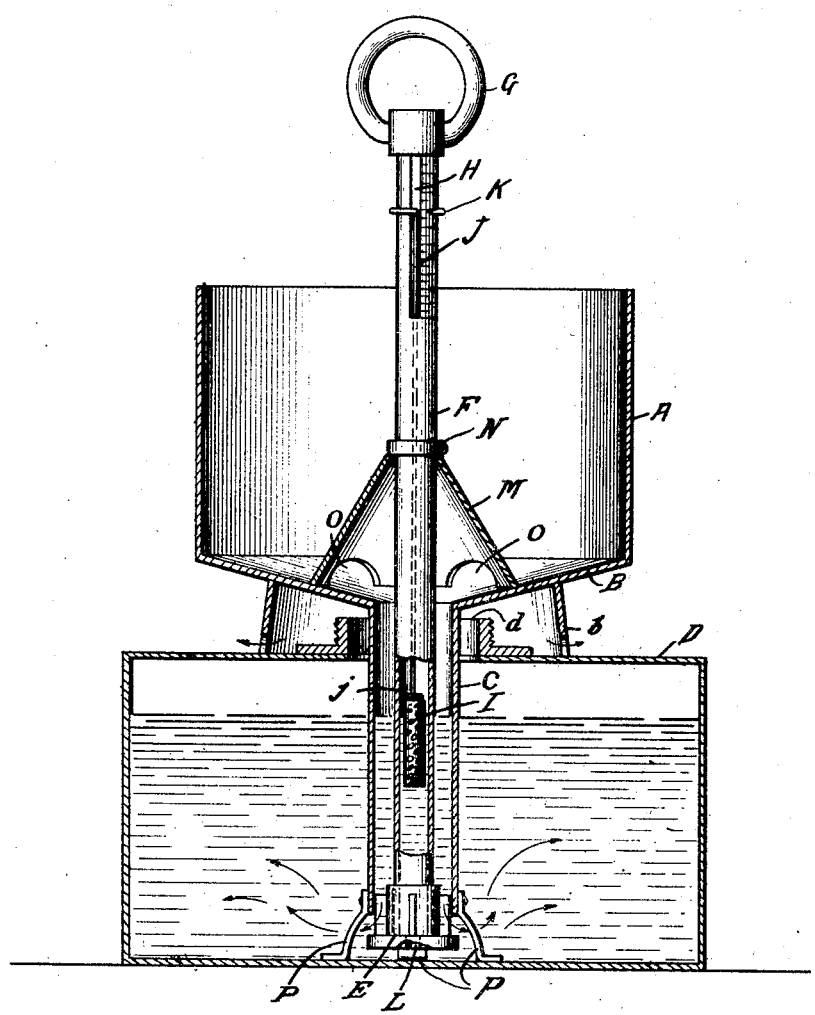
Witnesses
Inventor:
Frank L. Hoaglin

UNITED STATES PATENT OFFICE.

FRANK L. HOAGLIN, OF WAUPACA, WISCONSIN.

FUNNEL.

1,033,173.

Specification of Letters Patent.

Patented July 23, 1912.

Application filed January 26, 1911. Serial No. 604,725.

*To all whom it may concern:*

Be it known that I, FRANK L. HOAGLIN, a citizen of the United States, residing at Waupaca, county of Waupaca, and State of Wisconsin, have invented new and useful Improvements in Funnels, of which the following is a specification.

My invention relates to improvements in funnels.
The object of my invention is to provide a form of funnel which will automatically indicate the height of a liquid in the receptacle, which will permit air to escape from the receptacle while the liquid is being delivered thereto, and which may be lifted from the receptacle and removed without waiting until the contents of the funnel are discharged, and without permitting said contents to discharge when the funnel is so lifted.

In the following description, reference is had to the accompanying drawing illustrating my invention, which shows a vertical section exposing the tubular valve rod, the latter being also indicated, partly in section.

My improved funnel is provided with a receiving chamber or bowl A, the bottom B of which is preferably inclined toward a discharge spout C, which is adapted to be inserted in the receiving receptacle D. The bowl A is preferably provided with supporting members *b*, depending from the bottom, and which may comprise an annular flange. The supporting member *b* is adapted to rest upon the receptacle D, as shown in the drawing, and unless the discharge spout C of the funnel is of such size as to closely fit the opening of the receptacle D, space will be left, as indicated at *d*, for air to escape from the receptacle when it is being filled with liquid.

At the lower end of the spout C, a valve E is located, and connected by a tubular rod F with a handle G. The rod F is provided with a slot H near its upper end, and within the rod a float I is employed. This float is adapted to actuate an indicator wire J, which extends upwardly within the rod, and at its upper end is elbowed to extend outwardly through the slot H and connect with a ring K (preferably integrally formed), which ring encircles the rod F. The lower end of the wire J is preferably unconnected with the float I, but is coiled circularly to form a foot piece *j*, which rests loosely upon the upper end of the float. The valve E is provided with a central aperture L, communicating with the interior of the tubular rod F, so that liquid from the receptacle D may enter the rod F underneath the float I, through the aperture L. Within the funnel bowl A, a conical supporting member M is employed, which rests upon the base of the bowl and terminates at its upper end at a collar N which encircles the rod F and is secured thereto. The base of the member M is provided with openings O through which the liquid may pass and enter the spout C. This conical member M, not only serves as a guide for the rod F, but also facilitates the insertion of a strainer cloth or chamois skin strainer in a position to strain all liquid passing through the openings O to the spout.

In operation, the funnel being in position as shown in the drawing, liquid will be poured into the bowl A in the usual manner. The height of the liquid in the receptacle will be indicated by the ring K as it rises along the rod F, which rod may be provided with index marks as shown. When the ring K indicates that the receptacle is sufficiently filled, the funnel may be lifted by means of the ring G, which first actuates the rod F to close the valve E, after which the funnel will be supported from the valve E and may be removed from the receptacle without permitting the contents of the bowl A to escape. The contents of the tubular rod F will, however, escape through the opening L. The valve E performs the further function of deflecting the liquid from spout C outwardly, while the receptacle is being filled, and I thus avoid the downward suction usually found to exist with funnels provided with indicating floats, and which tends to depress the float below the level of the liquid in the receptacle. With my improved device, the pressure of the liquid, exerted through the aperture L, is not affected by the current in the liquid delivered through the spout C.

Where it is desired to use my improved funnel as a measuring funnel, the lower end of the spout C may be provided with feet P, and the funnel may thus be supported from the bottom of the tank independently of the supports *b*. In such case, the index characters at the upper end of the rod J may be utilized to accurately indicate the quantity of liquid, where my improved funnel is used in connection with a tank of known dimensions, and the index characters arranged with reference thereto.

Having thus described my invention, what I claim as new and desire to secure by Letters Patent, is—

1. The combination with a funnel, comprising a bowl having a depending spout, of a valve at the lower end of said spout, a tubular rod extending upwardly through the spout and bowl, a float in said rod, and an index wire in operative relation to said float, said valve having an aperture communicating with the interior of said rod from below the valve and the interior of said rod being otherwise closed at its lower end.

2. The combination with a funnel having a receiving bowl and depending spout, of a valve at the lower end of said spout, a tubular slotted valve stem connected therewith and extending upwardly through the spout and bowl, a float in said stem, means for admitting liquid to said stem below the float from a point where suction is not created by the liquid flowing through said spout, and a handle at the upper end of said stem, whereby the valve may be closed and the funnel lifted, together with a member in said funnel bowl arranged to support said rod, and an indicator connected with the float and exposed through the slot in the valve stem.

3. The combination with a funnel having a receiving bowl and depending spout, of a valve at the lower end of said spout, a tubular valve stem connected therewith and extending upwardly through the spout and bowl, and a handle at the upper end of said stem, whereby the valve may be closed and the funnel lifted, together with a member in said funnel bowl arranged to support said rod, a float in said stem, an index rod supported by the float and exposed through the upper portion of the rod, and means for permitting liquid in a receiving chamber to actuate said float without interference from the liquid flowing through said spout.

4. The combination with a funnel bowl having a depending spout and a valve at the lower end of said spout, a tubular valve rod extending upwardly through the spout and bowl, and longitudinally slotted near its upper end, a handle at the upper end of said rod, a wire indicator located in the rod and having its upper end projected through said slot and partially encircling the rod, a float in said rod in operative relation to said indicator wire, and means for admitting liquid to said rod from below the valve.

In testimony whereof I affix my signature in the presence of two witnesses.

FRANK L. HOAGLIN.

Witnesses:
PETER HOLST,
W. McHUGH.